J. KIEWICZ.
SEWING MACHINE.
APPLICATION FILED NOV. 26, 1917.

1,338,373.

Patented Apr. 27, 1920.
6 SHEETS—SHEET 1.

Inventor.
John Kiewicz
by Heard Smith & Tennant
Attys.

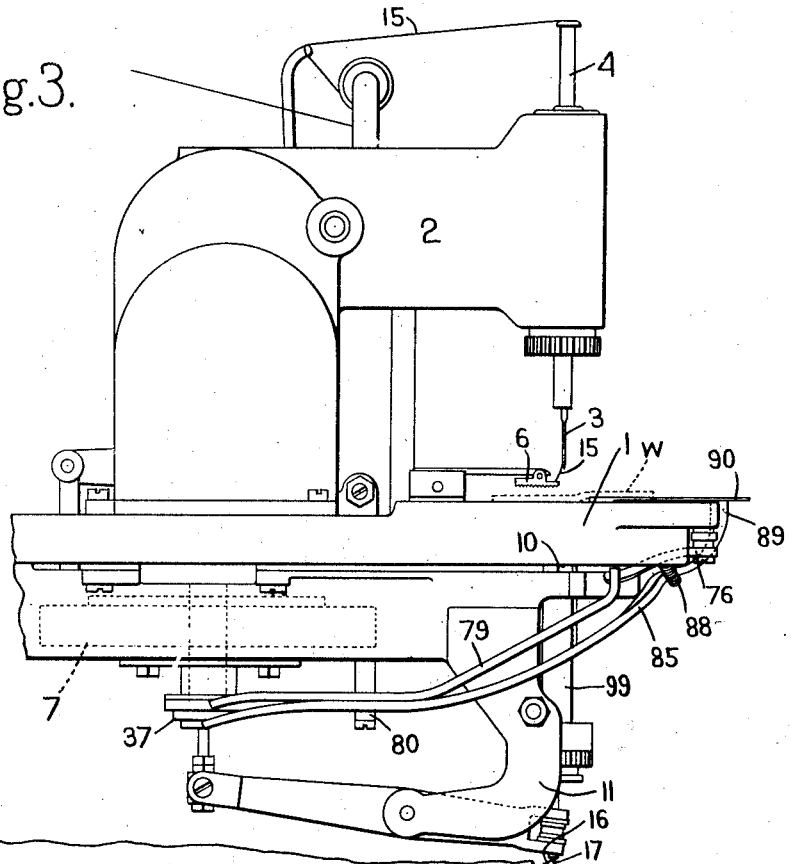
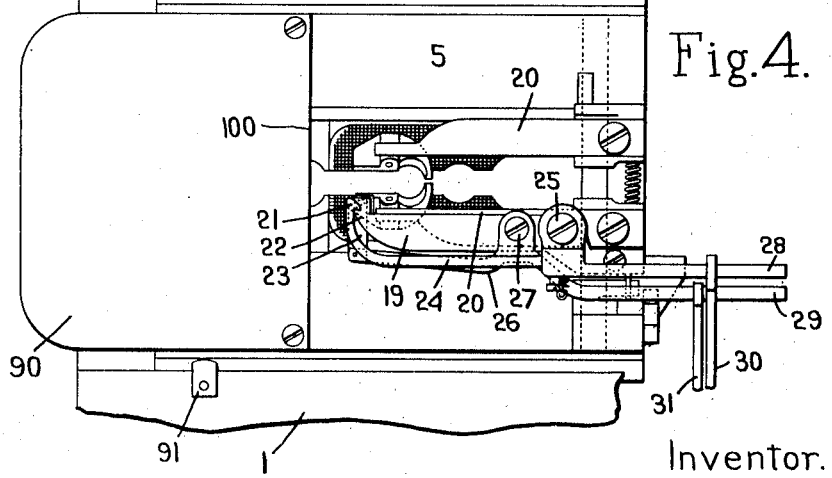

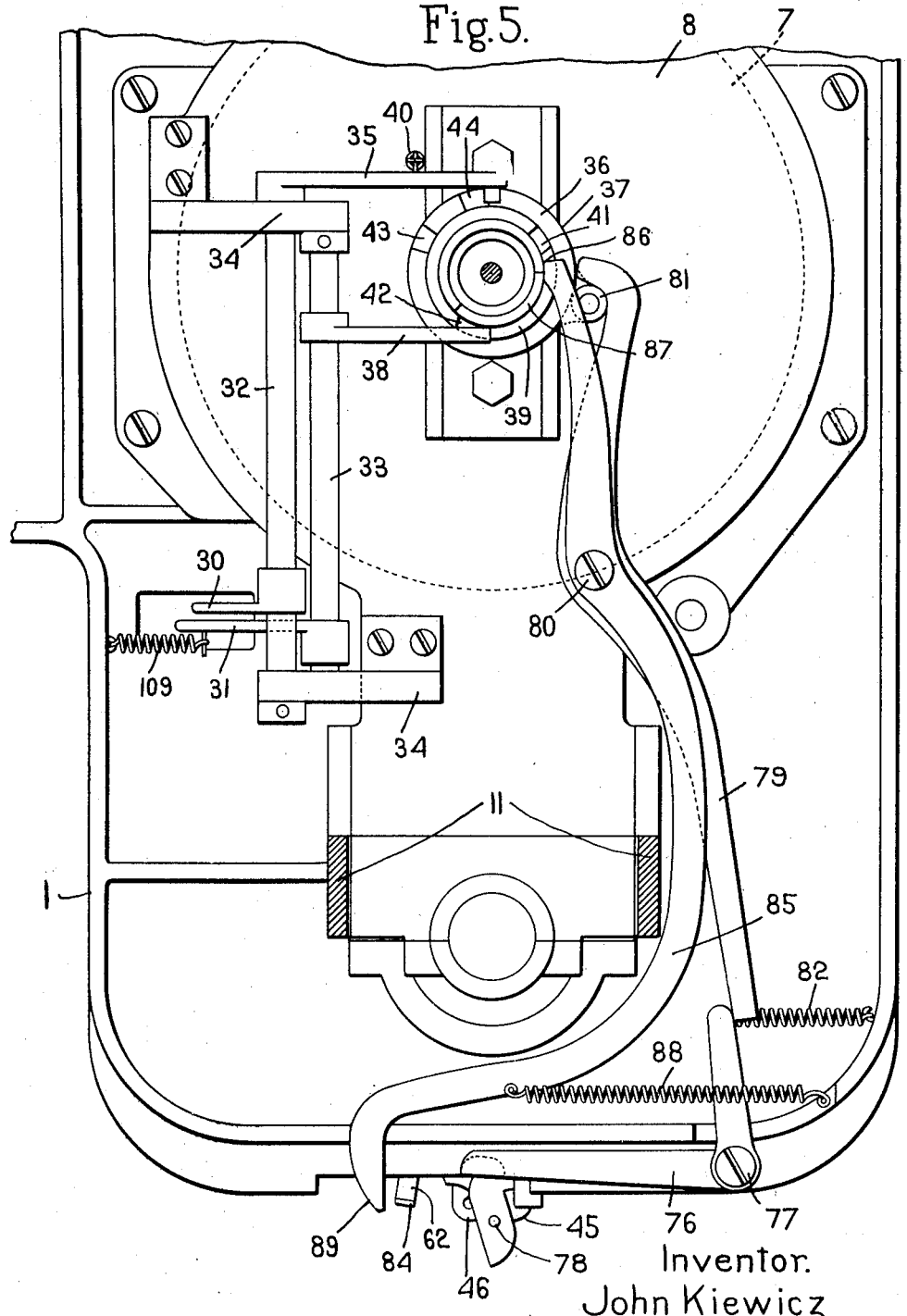

J. KIEWICZ.
SEWING MACHINE.
APPLICATION FILED NOV. 26, 1917.

1,338,373.

Patented Apr. 27, 1920.
6 SHEETS—SHEET 4.

Inventor.
John Kiewicz
by Heard Smith & Tennant.
Attys.

J. KIEWICZ.
SEWING MACHINE.
APPLICATION FILED NOV. 26, 1917.

1,338,373.

Patented Apr. 27, 1920.
6 SHEETS—SHEET 5.

Inventor.
John Kiewicz
by Heard Smith & Tennant.
Attys.

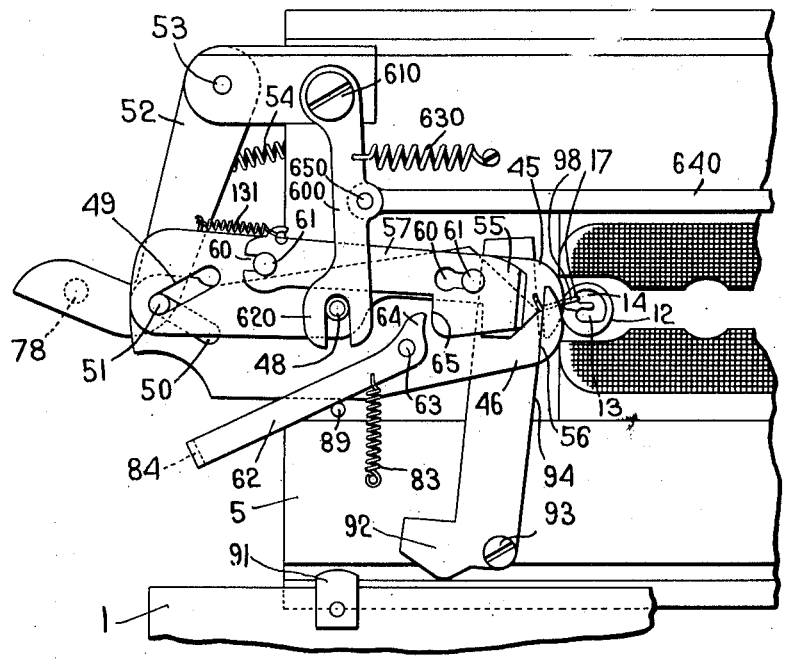

UNITED STATES PATENT OFFICE.

JOHN KIEWICZ, OF BOSTON, MASSACHUSETTS, ASSIGNOR TO THE REECE BUTTON HOLE MACHINE COMPANY, OF BOSTON, MASSACHUSETTS, A CORPORATION OF MAINE.

SEWING-MACHINE.

1,338,373.   Specification of Letters Patent.   Patented Apr. 27, 1920.

Application filed November 26, 1917. Serial No. 203,889.

*To all whom it may concern:*

Be it known that I, JOHN KIEWICZ, a citizen of the United States, residing at Boston, county of Suffolk, State of Massachusetts, have invented an Improvement in Sewing-Machines, of which the following description, in connection with the accompanying drawing, is a specification, like characters on the drawing representing like parts.

This invention relates to sewing machines and particularly to buttonhole sewing machines of that type which have both upper-thread-handling mechanism and under-thread-handling mechanism, the latter having provision for delivering a stay cord to the edge of the buttonhole as the stitching proceeds.

In the stitching of a plurality of buttonholes on a piece of goods, such, for instance, as the buttonholes on a shoe upper, or the buttonholes of a garment, it is desirable to sever the under thread and the stay cord at the completion of the stitching on each buttonhole so as to avoid the waste which would be entailed if the stay cord and under thread passed continuously from one buttonhole to the other. Further, where the stay cord is thus cut at the completion of each buttonhole, or other stitching operation, it is necessary either to hold the severed end of the stay cord when the stitching is commenced on the next buttonhole or to pull out from the source of supply a sufficient length so as to insure that the stay cord will be properly seamed into the buttonhole by the first stitches. Similarly, if the under thread is cut, it is desirable either to hold the severed end at the beginning of the stitching operation or to draw out a sufficient length from the supply so as to enable the first stitches of the next buttonhole to be properly formed. In either event, when the button hole is completed, the ends of the stay cord and under thread which were held or drawn out as the stitching operation on the buttonhole was commenced will project from the goods and thus form projecting ends which it is necessary to trim.

One of the objects of my invention is to provide a novel cutter or trimming device by which at the completion of the stitching operation on any buttonhole both the projecting end of the stay cord and that which leads to the supply will be cut close to the work, and also to provide a cutting or trimming device which not only thus trims the stay cord, but also trims close to the work both the projecting end of the under thread and the end which leads to the supply. With this invention, therefore, the successive buttonholes are formed with no waste of under thread or stay cord, and there is no necessity of any subsequent hand trimming operation to finish the buttonholes after they have been completed in the machine. My improved device for trimming the stay cord and under thread operates also to hold the severed ends until the stitching has begun on the next succeeding buttonhole. Another object of my invention is to provide a novel cutting means for the under thread which is constructed to be carried by work-clamping means of that type which is bodily removable from the frame, which cutting means is constructed to be bodily removable with the work-clamping means, and also to provide a means for operating said thread-cutting device which permits such bodily removal of the thread-cutting device with the work-holding or work-clamping means.

In United States Patent No. 1,188,944, dated June 27, 1916, which was granted on an application filed by me, a mechanism is illustrated and described for cutting and holding the upper or needle thread of a buttonhole sewing machine, which mechanism is carried by the removable work-holding means and is controlled as to its operation by a controlling cam which is associated with the main or feed cam of the sewing-machine by which the work clamp and other operative parts of the machine are controlled. In the present embodiment of my invention I have chosen to use this same controlling cam for actuating the trimming devices for the under thread and stay cord so that the cutting operations of both the upper thread trimmer and under thread trimmer are actuated or controlled from the same controlling cam.

In the device herein illustrated both the mechanism for cutting and holding the upper or needle thread and that for cutting and holding the under thread and stay-cord are carried by and are removable from the machine with the removable work-clamping means, and the actuating devices for both of said cutting mechanisms are such as to permit this bodily removal of said cutting mechanisms with the work-holding means.

In order to give an understanding of my invention, I have illustrated in the drawings a selected embodiment thereof which will now be described, after which the novel features will be pointed out in the appended claims.

In the drawings, Figure 1 is a side view of a portion of a buttonhole sewing machine having my improvements applied thereto;

Fig. 3 shows the opposite side of the sewing machine from that shown in Fig. 1;

Fig. 4 is a plan view of the clamp plate with the upper thread cutting and holding mechanism thereon;

Fig. 5 is an under side view of the portion of the bed plate showing the mechanism for operating the under trimmer and holder;

Figs. 8, 9 and 10 are views similar to Fig. 6 showing the parts of the trimming mechanism in different operative positions;

Fig. 11 is an end view of the clamp plate and under trimming mechanism thereon;

Fig. 12 is a perspective view of the controlling cam for controlling the operations of the thread trimmer;

Figs. 13 and 14 are diagrammatic views showing the operation of the under trimming device;

Fig. 15 is a perspective view showing a buttonhole with the ends to be trimmed.

Figure 1:
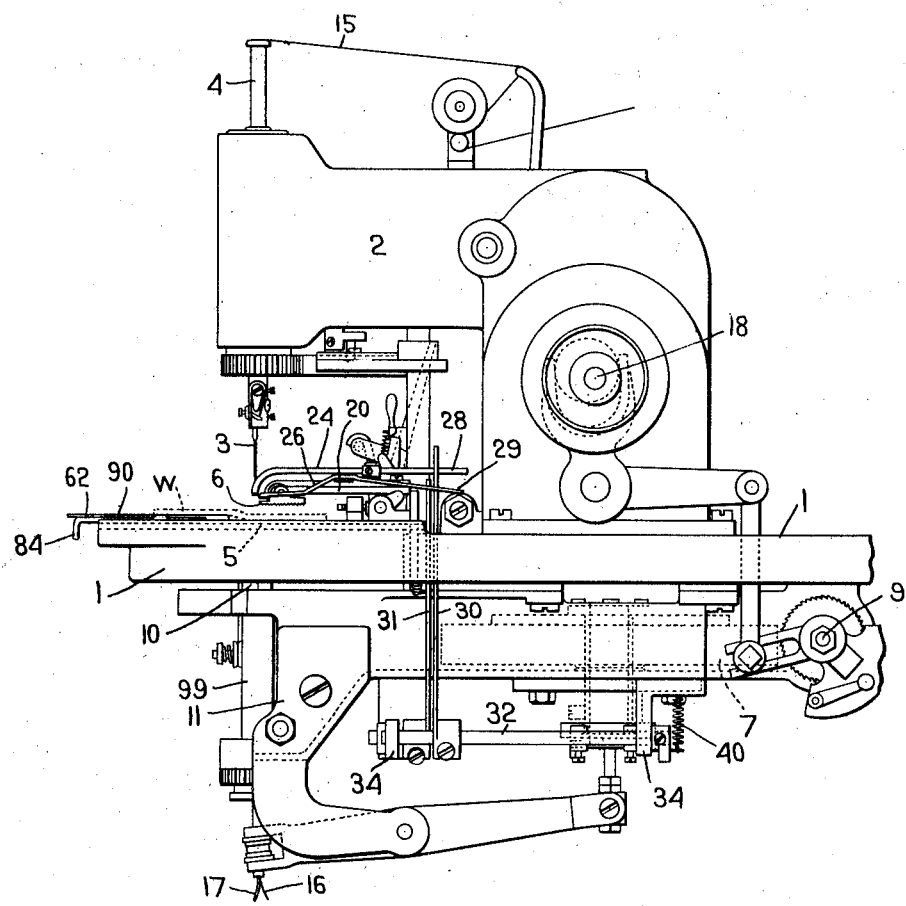

Since my invention relates to the mechanism for cutting and clamping the thread and stay cord at the end of the stitching operation, I have not deemed it necessary to illustrate all of the various parts of a complete sewing machine, but have contented myself with illustrating a sufficient portion of a sewing machine to enable the invention to be understood.

1 indicates the bed plate of the machine from which rises the head or overhanging arm 2 carrying the upper thread-handling mechanism which is in the form of a reciprocating eye-pointed needle 3 that is carried by the usual reciprocating needle bar 4. The bed plate 1 carries a clamp plate 5 on which the work $w$ is clamped by means of pivotally-mounted work clamps 6, said clamp plate and work clamps constituting work-holding or work-clamping means. This clamp plate is mounted on the bed plate 1 so that it can be moved backward and forward to give the work its feeding movement as the stitches are formed on the sides of the buttonhole and can swing laterally to assist the operation of stitching the two ends of the buttonhole, all as usual in buttonhole sewing machines. Said clamp plate with the work clamps pivotally mounted thereon are bodily removable from the frame in usual manner.

The movements of the clamp plate are derived from the main or feed cam 7 which is situated beneath the bed plate and is inclosed in the usual cam casing 8. This feed cam 7 is actuated from a shaft 9 by any suitable or usual means which it is not necessary to describe.

The under thread-handling mechanism may be of the type shown in United States Patent No. 1,188,944, dated June 27, 1916, and with the upper thread-handling mechanism forms the stitch-forming mechanism. The under thread-handling mechanism is indicated generally at 10 and is mounted on a turret 99 that is rotatably sustained in the depending portion 11 of the sewing machine frame and carries at its upper end a throat plate 12 through which the under thread is delivered. The under thread handling mechanism may have any suitable devices, such as a needle, looper, etc., for controlling the under thread and causing it to be concatenated with the upper thread during the formation of the buttonhole stitches. In some buttonhole sewing machines provision is made for the delivery of the stay-cord to the under side of the goods, which stay-cord is laid along the edge of the buttonhole as the stitching proceeds so that the buttonhole stitches are formed over said cord.

In the sewing machine herein illustrated the throat-plate 12 of the under thread-handling mechanism is provided with two passages 13 and 14 through which the under thread and stay-cord are delivered. The upper thread which is controlled by the upper needle 3 is indicated at 15, the under thread is indicated at 16, and the stay-cord at 17. The parts thus far described are or may be all as usual in buttonhole sewing machines, and as they form no part of my present invention, I do not deem it necessary to enter into a more detailed description of them, it being sufficient to say that when the machine is at rest, the clamp plate 5 and work clamp 6 are in buttonhole-cutting position shown in Fig. 1. When the machine is set in operation, the work-clamps 6 are first depressed thereby to clamp the work $w$ against the clamp plate 5, after which the cutter is actuated to cut the buttonhole, and when the buttonhole is cut, the clamp plate is given a quick movement toward the front of the machine or to the left Fig. 1 thereby to carry the work from buttonhole-cutting to stitching position. At this time the stitch-forming mechanism is set in operation, the latter being driven from the driving shaft 18 and the stitching proceeds down one side of the buttonhole, around the end of the buttonhole, and back the other side of the buttonhole, the clamp plate 5 being moved first forwardly and then backwardly as the stitching along the two sides of the buttonhole proceeds and being moved laterally to effect the stitching at the ends of the buttonhole, it being understood that the upper and under thread-handling mechanisms are rotated as the stitching around the ends of the buttonhole takes place. When the stitching on the buttonhole has been completed the driving shaft 18 is brought to rest and the work is unclamped, after which the clamp plate is given a quick movement from buttonhole-stitching position to its initial buttonhole-cutting position, which is the position shown in Fig. 1.

The device herein shown comprises means to cut and sever the upper thread 15 at the end of the stitching operation and to hold the severed end until the stitching operation has begun again, and also means to cut and hold the under thread 16 and also the stay-cord 17 at the end of the stitching operation, both of such means being mounted on the clamp plate 5. The devices illustrated for cutting and holding the upper thread 15 are similar to those illustrated in the above-mentioned Patent No. 1,188,944, and they comprise a plate or grip member 19 which is rigidly secured to one of the arms 20 of the work clamp 6, a thread-holding device 21 in the form of a hook which operates above the thread-gripping end 22 of the member 19, and a thread-cutter 23 which operates beneath the gripping member 19. The thread-holding member 21 is carried by the end of a lever or arm 24 pivoted at 25 to the arm 20 and the cutter 23 is secured to another lever or arm 26 which is pivoted at 27 to the arm 20. The rear ends 28 and 29 of the levers 24 and 26 are operatively engaged by the upper ends of arms 30 and 31 which extend down through the bed plate 1 and are fast on rock-shafts 32 and 33, respectively. These rock-shafts are journaled in suitable bearings 34 secured to the underside of the bed plate, and the rock-shaft 32 has fast thereon an arm 35 which rests on and is actuated by a cam surface 36 formed on a cam member 37 that is rigid with the feed cam 7, all as shown in the above-mentioned Patent No. 1,188,944, said arm being held against the cam surface by the spring 109. The shaft 33 also has an arm 38 rigid therewith which rests on and is actuated by the cam surface 39 formed on the cam 37, said arm being held against the cam surface by the spring 40. When, therefore, the arm 38 is moved downwardly, the rock-shaft 33 will be turned thereby operating through the arm 31 to move the cutter 23 backwardly, while movement of the arm 31 in the opposite direction will permit the spring 109 to give the cutter 23 its forward cutting movement. Similarly, movement of the arm 35 will operate through the connections above described to vibrate the thread-holding member 21. The cam 39 thus has the function of actuating the thread cutter, while the cam 36 has the function of actuating the thread holder. The cam 39 is provided with two notches 41, 42, and the cam 36 is provided with two cam portions 43 and 44, the purpose of having two cam portions on each cam surface being to provide for actuating the cutter and thread holder twice during each cycle of operations. When the machine has been brought to rest, the end of the upper needle thread 15 is held between the thread holder 21 and the end 22 of the plate 19, and the end of the thread remains thus held for an interval of time after the stitching operation on a buttonhole begins sufficient to form the initial stitches. When the machine is set in operation it will be understood that the cam 37 will begin its turning movement and by the time the initial stitches have been formed, the notch 41 comes under the arm 38, so as to permit said arm to move upwardly, this movement giving the cutter 22 a forward cutting movement which will cut the thread end close to the work. The cutter is then retracted to its inoperative position. After this thread end has been cut, the cam portion 43 on the cam 36 gives movement to the arm 35 so that the holder 21 is moved from its thread-gripping position outwardly to where it may discharge the loose thread end, after which the holder returns to its thread-gripping position. The stitching then proceeds down one side of the buttonhole and back the other side, and when the stitching on the buttonhole has been completed, the cam portion 44 of the cam 36 causes the thread holder 21 to have a forward movement into position to grasp the needle thread 15 between the needle and the work and to draw said thread laterally so as to grip the thread between the holder 21 and the end 22 of the plate 19. As soon as the thread has thus been gripped, the cam portion 42 of the cam 39 causes the arm 38 to give the cutter 23 a quick forward movement which severs the thread close to the work, the severed end remaining held by the thread holder until after the stitching on the next buttonhole has commenced.

In the above construction the connection between the ends 28, 29 of the levers 24, 26 and the arms 30 and 31 is such as to permit the work-holding means with the upper thread-cutting and holding devices thereon to be removed from the frame.

The mechanism for holding and cutting the under thread and stay cord is arranged to grip the thread and stay-cord beneath and close to the work at the end of each stitching operation, and then to draw out from the supply a short length of the under thread and stay-cord, after which the thread and stay-cord are severed between the gripping jaws and the work. The thread and stay-cord are held by the thread-holding means until the stitching operation begins on the next succeeding buttonhole, after which the under thread and stay-cord are released. This operation of drawing out a length of under thread and stay-cord and holding them until after the stitching operation on the next buttonhole has been commenced produces a short end of under thread and stay-cord which projects from the under side of the cloth at the point where the stitching on the buttonhole is commenced which is also the same point at which the stitching on the buttonhole ceases when the buttonhole is completed.

My improved under trimming mechanism is so constructed that at the end of the stitching on each buttonhole, it will seize not only the under thread and stay-cord which leads from the finished end of the buttonhole to the supply, but will also seize the ends of the stay-cord and under thread which are formed as the stitching on the buttonhole is commenced and will cut both ends of the stay-cord and under thread close to the work, thus producing a buttonhole having a finished appearance and one which does not have any projecting thread ends that have to be trimmed subsequently by hand.

My improved under thread trimming mechanism comprises a pair of thread-gripping jaws and a cutting blade. The thread-gripping jaws are mounted on and removable from the frame with the clamp plate 5. They are situated between the latter and the work and during the stitching operation they are held in an inoperative open position. At the end of the stitching operation on a buttonhole said jaws while still open are moved into position to grip the under thread and stay-cord and are then closed onto said thread and stay-cord, after which they are moved backwardly to their initial position, thus drawing out a short length of under thread and stay-cord. When the gripping jaws thus move forwardly to grip the under thread and stay-cord, they also grip and seize the projecting end of the stay-cord and under thread which projects from the under side of the cloth at the point where the stitching on the buttonhole is commenced and thus both ends of the stay-cord and thread are held by the gripping jaws. After the gripping jaws with both ends of both the stay-cord and under thread have been moved backwardly to their initial position, the cutter is actuated to cut both ends of the stay-cord and under thread close to the work, thus eliminating entirely all thread ends and producing a finished buttonhole. The gripping jaws retain their hold on the under thread and stay-cord until the next buttonhole has been commenced as above described.

Figure 6:
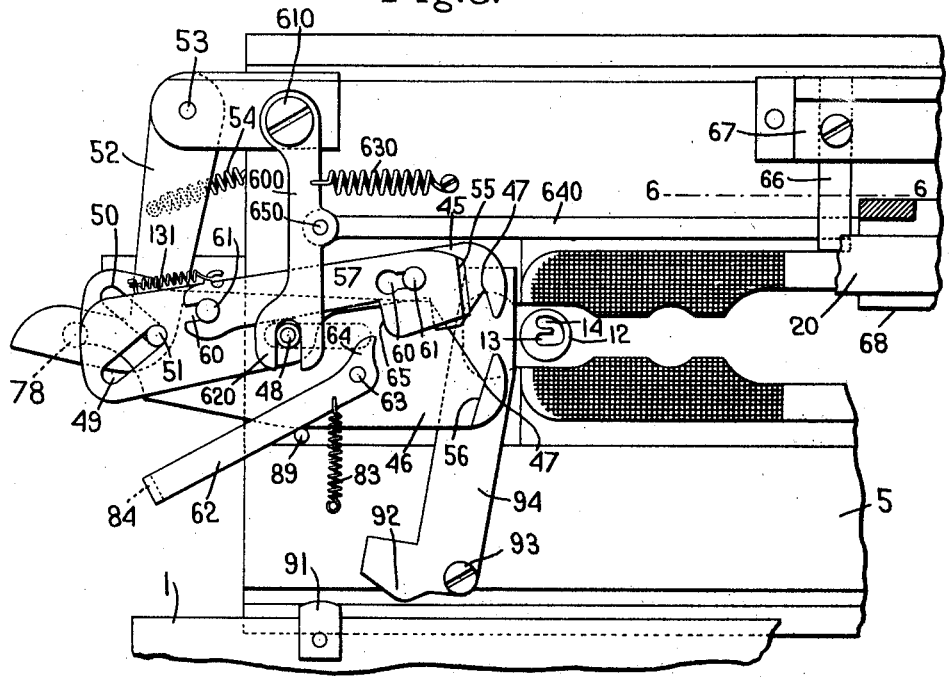
Fig. 6 is a plan view of the under thread-trimming mechanism.
Figure 7:
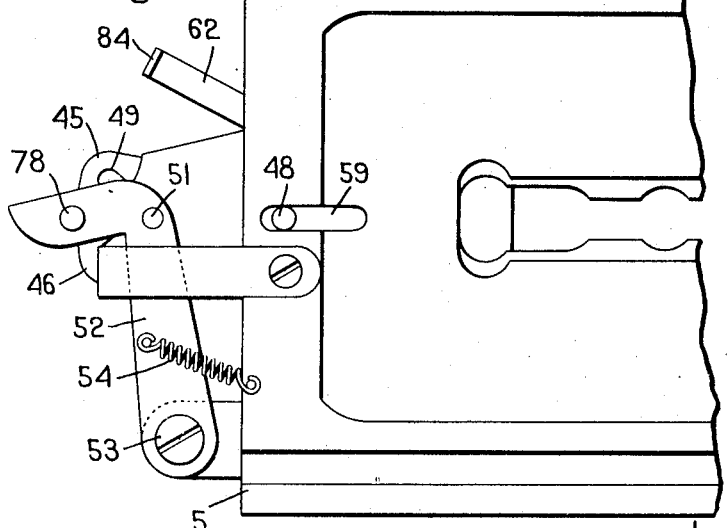
Fig. 7 is an under side view of one end of the clamp plate.
Figure 9:
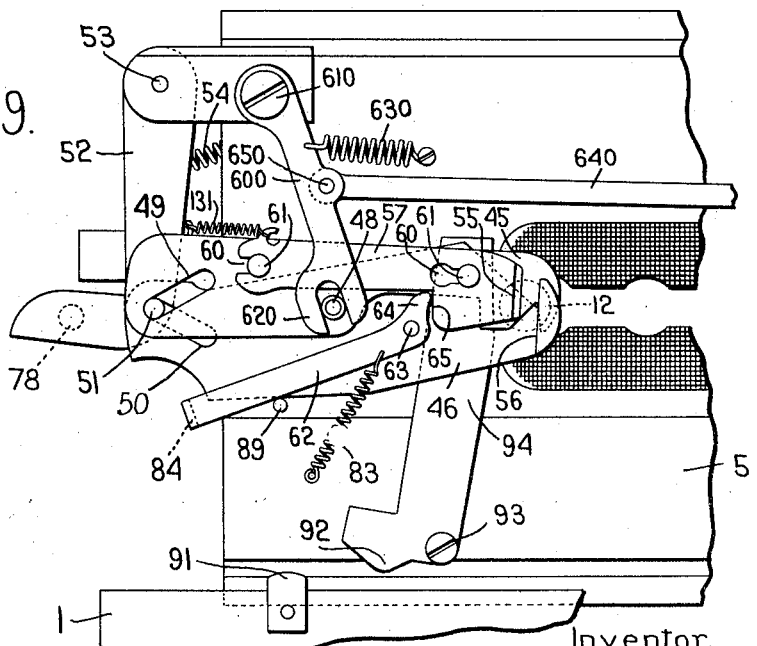

The thread-clamping jaws of the under thread-trimming mechanism are indicated at 45 and 46, respectively, these jaws each being shaped to present a thread-receiving notch 47. They are pivotally connected together by a pivotal stud 48 and the rear ends of the jaws are provided with inclined slots 49, 50 in which operates a pin 51 carried by a lever 52 that is pivoted to the clamp plate 5 at 53, said lever being acted upon by a spring 54 which tends to move it toward the clamp plate. The slots 49, 50 are inclined in opposite directions, and when the pin 51 is at the inner ends of the slots, the jaws are held in their open position relative to each other, as shown in Fig. 6, while when the pin 51 is moved to the outer ends of the slots, the jaws will be closed together, as shown in Fig. 9. The jaws 45 and 46 are slidably mounted on the clamp plate 5 so that they can be moved toward and from thread-gripping position. The thread cutter is indicated at 55 and it coöperates with a cutting shoulder 56 formed on the jaw 46. This cutter 55 is provided with a shank or body portion 57 having slots 60 therein in which are received guiding pins 61 carried by the jaw 45. The cutter is thus capable of having a sliding motion on the jaw 45, and said cutter is given its cutting movement by means of an actuating lever 62 pivoted at 63 on the jaw 46 and having a nose 64 which is adapted to engage the edge or portion 65 of the cutter. Said cutter is normally held in retracted position by the spring 131.

Figure 8:
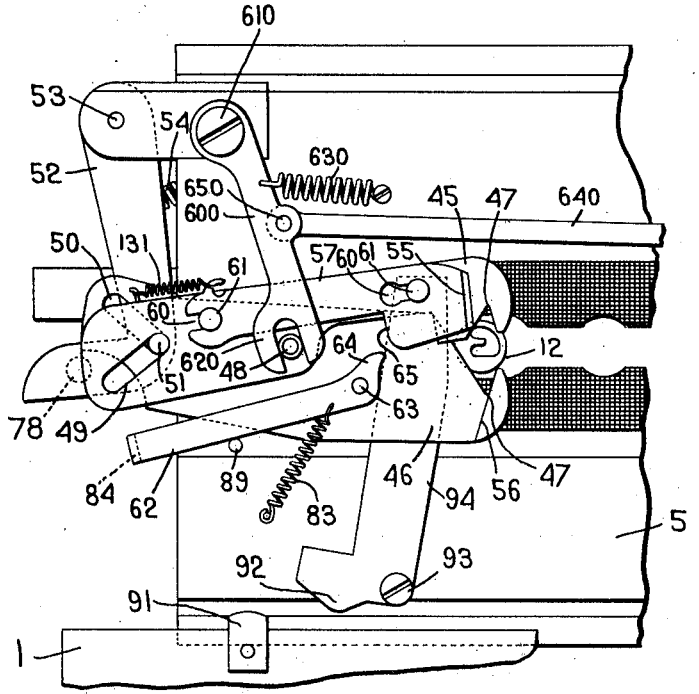

The operation of the under trimming device as thus far described will be readily understood by reference to Figs. 6 to 10. During the stitching operation the clamping jaws are in their retracted position and are open, as shown in Fig. 6. At the end of the stitching operation the work clamps 6 are first raised thereby unclamping the work and the clamping jaws are then moved into thread-clamping position, as shown in Fig. 8, while they are still open. This movement brings the jaws into position to grip the thread 16 and stay-cord 17. The pin 51 is then moved to the outer end of the slots 49, 50, thus closing the jaws together and gripping the under thread and stay-cord. This position is shown in Fig. 9. The closed jaws are then moved backwardly into the position shown in Fig. 10, thus drawing out from the throat-plate 12 a length of the under thread and stay-cord indicated at 98 and 97. The lever 62 is then actuated to force the cutter 55 forwardly against the cutting shoulder 56 thereby severing the thread and stay-cord between the gripping jaws and the work and close to the latter. The gripping jaws retain their hold on the ends 98 and 97 of the stay-cord and under thread until the stitching is commenced on the next succeeding buttonhole, after which the jaws are opened to release said ends. The holding of the end 98 of the stay-cord insures that it will be in proper position at the beginning of the stitching operation for the buttonhole stitches to be formed thereover, and the holding of the end 97 of the under thread insures that the first stitch will be properly formed.

When the stitching on the buttonhole is finished and before the under-trimming mechanism is operated to trim the stay-cord and under thread, the buttonhole will have the ends 98, 97 of the stay-cord and under thread projecting therefrom at the point where the stitching on the buttonhole begins, these ends being those which were held by the gripping jaws at the beginning of the stitching operation, and will also have portions 95 and 96 of the stay-cord and under thread leading therefrom to the throat plate at the point where the stitching on the buttonhole terminates.

I have described above how the trimming device operates to sever the portion of the stay-cord and under thread leading to the supply. The improved trimming device also operates to grip and sever the loose ends 98, 97 of the stay-cord and under thread at the same time that it cuts the portion of the thread and stay-cord leading to the throat-plate, so that the result is a buttonhole having both ends of the stay cord and under thread cut close to the work. The stitching commences and terminates at the same end of the buttonhole so that the ends 97 and 98 of the stay-cord and under thread are in close proximity to the portions 95 and 96 of the stay-cord and under thread which lead to the throat-plate. When, therefore, the gripping jaws move forwardly into the position shown in Fig. 8 and then are closed, as shown in Fig. 9, said jaws grip not only the portions 95 and 96 of the stay-cord and under thread that lead to the throat-plate, but also the ends 97, 98, and when the cutter 55 moves forwardly, it cuts both ends of the stay-cord and under thread.

In order to insure that the ends 98 and 97 of the stay-cord and under thread will always be properly positioned to be gripped by the gripping jaws when they are closed, I propose to employ a positioning member in the form of a plate which is situated so as to have contact with the under side of the work and have also provided means for moving this positioning plate toward the throat-plate to cause it to enter between the ends 97, 98 and the work, thereby directing said ends downwardly so that they will be positioned properly to be engaged by the gripping jaws. This positioning plate is shown at 94 and it is pivoted to the clamp plate 5, as shown at 93. The positioning plate is formed at one end with a cam portion 92 which is adapted to engage a projection 91 carried by the bed plate 1 as the clamp plate moves back and forth.

Figure 2:
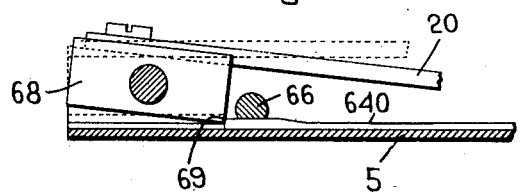
Fig. 2 is a sectional detail view on the line 6—6, Fig. 6.

When the gripping jaws are retracted into the position shown in Fig. 10, the length of stay-cord and under thread which is thus drawn out engages the edge of the positioning plate 94 and swings the latter backwardly into the position shown in Fig. 10. During the stitching on the next buttonhole, the longitudinal movement of the clamp plate 5 will cause the cam portion 92 of the positioning member 94 to engage the projection 91, thereby swinging the positioning member toward the throat plate. This movement occurs after the ends 97, 98 have been released from the gripping jaws, and such movement of the positioning member carries the edge thereof between the under side of the work and the ends 98, 97 and directs said ends downwardly, as shown in Fig. 13, thus positioning the ends in proper position to be engaged by the gripping jaws at the end of the stitching operation. While any suitable devices may be used for actuating the various parts of the under trimming mechanism, I propose to provide a spring for moving the jaws from the position shown in Fig. 6 to that shown in Fig. 8, the action of which spring is controlled by some moving part of the machine, and I also propose to effect the closing of the gripping jaws and their backward movement by devices actuated from the cam member 37. The pivotal pin 48 of the jaws 45 and 46 projects through and operates in a slot 59 formed in the clamp plate 5. 600 indicates a lever or arm pivoted to the clamp plate 5 at 610 and having a forked end 620 which embraces the pivotal pin 48. This arm is acted upon by a spring 630 which is connected at one end to the clamp plate and which tends to move the arm toward the right, Fig. 6. Said arm 600 has a strut member 640 pivotally connected thereto at 650, which strut member extends longitudinally of the clamp plate 5, and the end of which is located under a positioning pin 66 carried by the bracket 67 to which the work clamp 6 is pivoted. The work clamp 6 is carried by arms 20 which are secured to pivotally-mounted blocks 68, said blocks being so constructed that when the work clamps are depressed the edge 69 of the blocks is carried close to the upper face of the clamp plate 5, while when the work clamp is released, the edge 69 is separated a distance from the work clamp, as shown in Fig. 2. I employ this block 68 as the means for controlling the action of the spring 630. During the stitching operation and when the work is clamped the end of the strut rod 640 will have engagement with the edge 69 of the block 68 and thus the gripping jaws will be held in their retracted position. When the stitching operation is completed and the work is unclamped, the edge 69 is then carried above the end of the strut 64, thereby allowing the spring 630 to come into play to move the gripping jaws from the position shown in Fig. 6 to that shown in Fig. 8.

It will be remembered that the closing movement of the jaws and their backward movement is accomplished by the swinging movement of the lever 52, and this in turn is controlled from the cam 37. For this purpose I provide an elbow-lever 76 pivoted to the frame at 77, and one end of which is adapted to engage a pin 78 depending from the end of the lever 52 and the other end of which is acted upon by one end of a lever 79 pivoted to the frame at 80 and adapted to be engaged by a roll or projection 81 carried by the cam 37. The lever 76 is acted upon by a spring 82 which holds it in its inoperative position. The projection 81 is so positioned that it will give the lever 79 a quick swinging movement after the jaws have been moved forwardly into the position shown in Fig. 8, such movement causing the lever 52 to swing backwardly from the clamp plate. During the initial swinging movement of the lever 52, the pin 51 moves backwardly in the slots 49, 50, thereby closing the jaws, and when the pin reaches the rear ends of said slots, then further movement of the lever 52 will retract the jaws into the position shown in Fig. 9.

As stated above the cutting movement of the cutter 55 is accomplished by the lever 62 which is pivoted to the jaw 46 at 63. This lever is acted upon by a spring 83 which normally tends to hold it in retracted position, and it is provided at its outer end with a depending lip 84 which is adapted to be acted upon by a lever 85 pivoted to the frame at 80, and the inner end of which is controlled by a face cam 86 formed on the cam member 37. This face cam normally holds the lever 85 in its inoperative position shown in Fig. 5, but said cam is provided with a notch 87 which is positioned to come opposite the inner end of the lever 85 at the time that the cutting operations are to be performed. When the notch 87 comes in line with the inner end of the lever 85, the spring 88 which is connected to said lever will give the latter a quick movement in a direction to bring the end 89 thereof against the lip 84, thus turning the lever 62 and causing the toe 64 thereof to force the knife forwardly against the shoulder 56 thereby to cut the stay-cord and under thread.

89 is a stop pin carried by the clamp plate 5 and which limits the backward swinging movement of the lever 62 due to the action of the spring 83. Since the lever 62 is carried by the clamp plate, it will have a backward and forward movement with the clamp plate, but said lever 62, as well as the lever 85, are so shaped that the lip 84 will be so positioned as to be engaged by the end of the lever 85 at the time that the cutting operation is to be performed. It will be noted that the under trimming mechanism is supported by the clamp plate 5 and is situated on the upper side thereof.

In order that the work may not interfere with the movements of the under trimming device, I propose to cover said device by means of a cover plate 90 which is shaped to inclose the parts of the under trimming device when they are in their retracted position. An opening is left between the edge 100 of the cover plate 90 and the clamp plate through which the jaws 45 and 46 may be projected when they are moved into their gripping position, as shown in Fig. 8.

As stated above, the clamp plate 5 with the work clamps 6 pivotally mounted thereon is constructed so that it can be removed bodily from the frame, this being provided for by mounting said clamp plate in ways which are open at the front of the frame so that the clamp plate can be withdrawn from the front of the frame or bed plate. The cutting and holding devices for the under thread and stay-cord are mounted on the clamp plate and are bodily removable therewith and the levers 76 and 85 are so constructed and shaped as to permit such removal of the clamp plate. It will be noted that the end of the lever 76 which engages the pin 78 is situated at the rear of said pin so that said lever does not interfere at all with the withdrawing of the clamp plate from the front of the frame. It will also be noted that the end 89 of the lever 85 stands along side of the depending end 84 of the lever 62 and thus when said lever is in the position shown in Fig. 5 it does not interfere at all with the removal of the clamp plate and the mechanism for cutting the under thread and stay-cord.

It will, therefore, be seen that in the illustrated construction both the devices for cutting and holding the upper or needle thread and those for cutting and holding the under thread and stay cord are mounted on the removable work-holding means and are removable bodily therewith, and that the connections for operating said thread-cutting devices are such as to permit this removal of the work-holding means.

While I have illustrated herein a selected embodiment of my invention, I do not wish to be limited to the constructional features shown. Further, while I have illustrated the invention as applied to a buttonhole sewing machine, yet it will be understood that certain features of the invention may be applied to other machines where it is desired to trim the thread close to the work at the end of each seam.

I claim:

1. In a sewing machine, the combination with work-holding means, of means to form a series of short seams and to lay a stay-cord along the seam as it is formed, and stay-cord-trimming mechanism comprising means to hold the end of the stay-cord while the stitching of each seam is commenced, and means to cut close to the work both the end of the stay-cord which projects from the seam at the point where the latter is commenced and the end of the stay-cord which leads to the supply at the end of the seam.

2. In a sewing machine, the combination with work-holding means, of means to form a series of short seams and to deliver a stay-cord to each seam as it is formed, and stay-cord-trimming mechanism comprising a pair of gripping jaws, a cutter, and means to actuate said jaws to cause them to hold one end of the stay-cord when the seam is commenced and then to release said end, and at the completion of the seam to seize both said end of the stay-cord and also that leading to the supply, and then to cut both ends.

3. In a sewing machine, the combination with work-holding means, of means to form a series of short seams such as spaced buttonholes and to deliver a stay-cord to each seam as it is formed, and stay-cord-trimming mechanism carried by the work-holding means and comprising a gripping device, a cutting device, and means to actuate said devices at the end of each seam to cause the gripping device to grip both ends of the stay-cord and the cutting device to cut both ends between the gripping device and the work.

4. In a sewing machine, the combination with work-holding means, of mechanism to form a series of short seams such as spaced buttonholes and to deliver a stay-cord to each seam on the underside of the work, and stay-cord-trimming mechanism carried by the work-holding means and comprising a pair of gripping jaws and a cutting member, and means to actuate said jaws and cutting member at the end of each seam to cause the jaws to grip both ends of the stay-cord and the cutting member to cut both ends of the stay-cord between the gripping means and the work.

5. In a sewing machine of the type adapted to perform a predetermined sewing operation and then come to rest, the combination with work-clamping means for clamping the work during the entire predetermined sewing operation and comprising a clamp plate on which the work rests and a work clamp for clamping the work to the clamp plate, of stitch-forming mechanism comprising means for concatenating an upper and an under thread, means carried by the clamp plate for cutting the upper thread above the work, means also carried by the clamp plate for cutting the under thread beneath the work, a cam device for actuating both of said cutting means, and means for actuating the stitch-forming mechanism and cam device in timed relation with each other.

6. In a sewing machine of the type adapted to perform a predetermined sewing operation and then come to rest, the combination with work-clamping means comprising a clamp plate on which the work rests and a work clamp for clamping the work thereagainst, of stitch-forming mechanism comprising means for concatenating an upper and an under thread, means carried by the clamp plate for cutting the upper thread above the work, other means carried by the clamp plate for cutting the under thread beneath the work and holding the severed end thereof, a cam device for actuating both of said cutting devices, and means to actuate said cam device and stitch-forming mechanism in timed relation.

7. In a sewing machine, the combination with a frame, of work-holding means comprising a clamp plate for supporting the work and means to clamp the work against said plate, stitch-forming mechanism supported on the frame and comprising means for concatenating an upper and an under thread, means to move the work-holding means with the work clamped thereon bodily relative to the frame thereby to feed the work, and means carried by and movable with the work-holding means and situated between the clamp plate and the work for cutting the under thread at the end of the stitching operation and holding the cut end of the thread.

8. In a sewing machine, the combination with work-holding means, of stitch-forming mechanism comprising means for concatenating an upper and an under thread, actuating means to cause a relative feeding movement between the work-holding means and stitch-forming mechanism, a cutting device carried by said work-holding means to cut the under thread between the work and work-holding means at the end of a stitching operation, and connections actuated or controlled from said actuating means to cause the proper operation of said cutting device.

9. In a sewing machine, the combination with work-holding means, of stitch-forming mechanism comprising means for concatenating an upper and an under thread, actuating means to cause a relative feeding movement between the work-holding means and stitch-forming mechanism, a thread-cutting and holding device carried by the work-holding means to cut the under thread between the work and work-holding means at the end of each stitching operation and to hold the severed end thereof, and connections actuated or controlled from said actuating means to cause the proper operation of said cutting and holding device.

10. In a sewing machine, the combination with work-holding means, of stitch-forming mechanism comprising means to concatenate an upper and an under thread, actuating means to cause a relative feeding movement between said work-holding means and stitch-forming mechanism, a thread-cutting device for cutting the upper thread, another thread-cutting device carried by the work-holding means for cutting the under thread between the work and work-holding means, and connections actuated or controlled by said actuating means to cause the proper operation of both of said cutting devices at the end of each stitching operation.

11. In a sewing machine, the combination with a frame, of work-holding means comprising a clamp plate and work-clamping means slidably carried by said frame, means to form a series of short seams and to lay a stay-cord along each seam as it is formed, and stay-cord-trimming mechanism carried by the clamp plate and comprising means to hold the end of the stay-cord while the stitching on each seam is commenced, and means to cut close to the work both the end of the stay-cord which projects from the seam at the point where the latter is commenced and the end of the stay-cord which leads to the supply at the end of the seam.

12. In a sewing machine, the combination with a frame, of work-holding means comprising a clamp plate and work-clamping means, means to form a series of short seams and to deliver a stay-cord to each seam as it is formed, means to give the clamp plate a feeding movement on the frame, means operative at the end of each seam to draw out a length of the stay-cord and to cut close to the work both the end of the stay-cord which leads to the supply and the projecting end which was drawn out at the termination of the previous seam.

13. In a sewing machine, the combination with a frame, of work-holding means movably mounted thereon and comprising a clamp plate, means to form a series of short seams and to lay a stay-cord along each seam as it is formed, a pair of gripping jaws carried by the clamp plate, and means operative at the end of each seam to cause the gripping jaws to grip the stay-cord and draw out a length from the source of supply, and means to cut the stay-cord between the jaws and the work.

14. In a sewing machine, the combination with work-holding means and stitch-forming mechanism comprising means for concatenating an upper and an under thread, of a feed cam for giving relative feeding movement to said work-holding means and stitch-forming mechanism, a thread cutter for cutting the under thread beneath the work and between the latter and the work-holding means, and means associated with said feed cam for actuating said thread cutter.

15. In a sewing machine, the combination with work-holding means and stitch-forming mechanism comprising means for concatenating an upper and an under thread, of a feed cam for giving relative feeding movement to said work-holding means and stitch-forming mechanism, a device for cutting and holding the under thread beneath the work and between the latter and the work-holding means, and means associated with said feed cam for actuating said device.

16. In a sewing machine, the combination with work-holding means, of stitch-forming mechanism comprising means for concatenating an upper and an under thread, a feed cam for giving relative feeding movement to the work-holding means and stitch-forming mechanism, a thread-cutting device for cutting the upper thread above the work, a thread-cutting device for cutting the under thread beneath the work, and means associated with said feed cam for actuating both of said thread-cutting devices.

17. In a sewing machine, the combination with work-holding means, of stitch-forming mechanism comprising means for concatenating an upper and an under thread, a feed cam for giving relative feeding movement to said work-holding means and stitch-forming mechanism, a thread-cutting and holding device for cutting the upper thread above the work, another thread-cutting and holding device for cutting the under thread beneath the work, and means associated with said feed cam for actuating both of said devices at the proper time in the cycle of operations.

18. In a sewing machine, the combination with a frame, of stitch-forming mechanism carried thereby and comprising means for concatenating an upper and an under thread, work-holding means removably carried by the frame, a feed cam for giving relative feeding movement to the stitch-forming mechanism and work-holding means, a thread-cutting device carried by the work-holding means and adapted to cut the under thread beneath the work, an actuating cam associated with the feed cam, and operative connections between said actuating cam and thread-cutting device by which the thread-cutting device is actuated but which permit the removal of the work-holding means from the frame.

19. In a sewing machine, the combination with a frame, of work-holding means removably sustained thereby, stitch-forming mechanism comprising means to concatenate an upper and an under thread, means to actuate said stitch-forming mechanism to produce a series of successive seams, a pair of gripping jaws carried on and removable with the work-holding means, and means operative at the end of each seam to move said jaws in the direction of feed into position to grip the under thread beneath the work and then to close said jaws onto said thread.

20. In a sewing machine, the combination with a frame, of work-holding means removably sustained thereby, stitch-forming mechanism comprising means to concatenate an upper and an under thread, means to actuate said stitch-forming mechanism to produce a series of successive seams, a pair of gripping jaws carried on and removable from the frame with the work-holding means, means operative at the end of each seam to move said jaws in the direction of feed into position to grip the under thread beneath the work and then to close said jaws onto said thread, and means to sever the under thread between the work and said jaws.

21. In a sewing machine, the combination with work-holding means of stitch-forming mechanism, a feed cam to produce relative feeding movement between the work-holding means and stitch-forming mechanism, a pair of gripping jaws mounted on the work-holding means, and means associated with the feed cam to actuate or control said jaws thereby to cause them to move relative to the work-holding means into thread-gripping position at the end of each sewing operation and then to close onto and grip the thread beneath the work and afterward to move in an opposite direction to draw out a length of thread from the source of supply.

22. In a sewing machine, the combination with work-holding means, of stitch-forming mechanism, a feed cam to produce relative feeding movement between the work-holding means and stitch-forming mechanism, a pair of gripping jaws mounted on the work-holding means, means associated with the feed cam to actuate or control said jaws thereby to cause them to move relative to the work-holding means into thread-gripping position at the end of each sewing operation and then to close onto and grip the thread beneath the work and afterward to move in an opposite direction to draw out a length of thread from the source of supply, and means to cut the thread between the jaws and the work.

23. In a sewing machine, the combination with work-holding means comprising means to clamp and release the work, of stitch-forming mechanism, a feed cam to give relative feeding movement between the work-holding means and stitch-forming mechanism, a pair of gripping jaws mounted on the work-holding means, an actuating cam connected to the feed cam, a spring normally tending to move the jaws from their inoperative position into thread-gripping position, means to hold the spring from operation until the work is unclamped at the end of a sewing operation, and a device actuated by said cam for closing the jaws onto the thread and retracting the closed jaws.

24. In a sewing machine, the combination with work-holding means, of stitch-forming mechanism, a feed cam to give relative feeding movement between the work-holding means and stitch-forming mechanism, a pair of gripping jaws mounted on the work-holding means, an actuating cam connected to the feed cam, a spring normally tending to move the jaws from their inoperative position into thread-gripping position, means to hold the spring from operation during each sewing operation and to release the spring at the end of the sewing operation whereby the jaws are moved into thread-gripping position, a device actuated by said cam for closing the jaws onto the thread and retracting the closed jaws, and another device actuated by said actuating cam to cut the thread between the jaws and the work.

25. In a sewing machine, the combination with a work clamp operative to clamp and release the work, of stitch-forming mechanism, a thread-cutting device, and means controlled by the work clamp for moving the cutting device into position to cut the thread leading from the work when the work is unclamped.

26. In a sewing machine, the combination with a frame, of work-holding means removably sustained thereby, stitch-forming mechanism comprising means for concatenating an upper and an under thread and for laying a stay-cord along the seam as it is formed, means carried by and removable with the work-holding means for cutting the upper thread above the work, and other means carried by and removable with the work-holding means for cutting the stay-cord beneath the work.

27. In a sewing machine, the combination with a frame, of work-holding means removably sustained thereby, stitch-forming mechanism comprising means for concatenating an upper and an under thread and for laying a stay-cord along the seam as it is formed, a feed cam for giving feeding movement to the work-holding means during the stitching operation, means carried by and removable with the work-holding means for cutting the upper thread above the work, other means carried by and removable with the work-holding means for cutting the stay-cord beneath the work, and means associated with said feed cam for actuating both cutting means.

28. In a sewing machine, the combination with a frame, of work-holding means removably sustained thereby, means to form a series of short seams and to lay a stay-cord along each seam as it is formed, a feed cam for giving feeding movement to the work-holding means, and means carried by and removable with the work-holding means for cutting the stay-cord beneath the work at the end of each seam, and means associated with said feed cam for actuating the stay-cord-cutting means.

29. In a sewing machine of the type constructed to sew a short seam and then come to rest, the combination with work-clamping devices arranged to clamp the work during the sewing of the seam and to unclamp the work at the end of the seam, thread-cutting devices comprising two cutting elements movable relative to each other, means rendered operative by unclamping of the work to bring the thread-cutting devices into position to engage the thread, and means to actuate the cutting devices.

30. In a sewing machine of the type adapted to produce a short seam and then to be brought to rest, the combination with work clamps for clamping the work during the sewing of the seam and for unclamping the work at the end of the seam, of a thread-cutting device comprising two cutting elements situated beneath the work, means rendered operative by the unclamping of the work to move the thread-cutting device into position to cut the under thread beneath the work, and means to give the cutting elements their cutting movement.

31. In a sewing machine of the type adapted to produce a short seam and then come to rest, the combination with a clamp plate on which the work is supported, of work clamps for clamping the work thereagainst, two cutting elements carried by the clamp plate beneath the work, means rendered operative by the unclamping of the work to move the thread-cutting elements into position to cut the under thread, and means to give the cutting elements a thread-cutting movement.

32. In a sewing machine, the combination with a clamp plate on which the work is supported, of work clamps for clamping the work thereto, two thread-engaging jaws pivotally connected together and movably mounted on the clamp plate, means rendered operative by the unclamping of the work for moving the jaws into thread-engaging position, and means for moving the jaws relative to each other to cause them to engage the under thread.

33. In a sewing machine, the combination with a clamp plate on which the work is supported, of work clamps for clamping the work thereto, two thread-engaging jaws pivotally connected together and movably mounted on the clamp plate, means rendered operative by the unclamping of the work for moving the jaws into thread-engaging position, means for moving the jaws relative to each other to cause them to engage the under thread, and means to retract said jaws thereby to draw out a length of thread.

34. In a sewing machine, the combination with a clamp plate on which the work is supported, of work clamps for clamping the work thereto, a pair of pivotally-connected thread-engaging jaws mounted for bodily movement on the clamp plate, each jaw having an inclined slot therein and said slots being oppositely inclined, a pin operating in said slots, means rendered operative by the unclamping of the work for moving the jaws into thread-engaging position, and means to move said pin in said slots thereby to close the jaws onto the thread and then to retract the jaws to pull out a length of thread.

35. In a sewing machine, the combination with a clamp plate on which the work is supported, of work clamps for clamping the work thereto, a pair of pivotally-connected thread-engaging jaws mounted for bodily movement on the clamp plate, each jaw having an inclined slot therein and said slots being oppositely inclined, a pin operating in said slots, means rendered operative by the unclamping of the work for moving the jaws into thread-engaging position, means to move said pin in said slots thereby to close the jaws onto the thread and then to retract the jaws to pull out a length of thread, and means to cut the thread close to the work.

In testimony whereof I have signed my name to this specification.

JOHN KIEWICZ.